(No Model.)

A. M. CHAVEZ.
PLOW.

No. 493,246. Patented Mar. 14, 1893.

WITNESSES:
Chas. Nida
C. Sedgwick

INVENTOR:
A. M. Chavez
BY Munn & Co
ATTORNEYS

UNITED STATES PATENT OFFICE.

AGUSTIN M. CHAVEZ, OF MEXICO, MEXICO.

PLOW.

SPECIFICATION forming part of Letters Patent No. 493,246, dated March 14, 1893.

Application filed March 25, 1892. Serial No. 426,363. (No model.) Patented in France July 6, 1891, No. 214,662.

*To all whom it may concern:*

Be it known that I, AGUSTIN M. CHAVEZ, of the city of Mexico, Mexico, have invented a new and useful Improvement in Plows, (for which I have obtained Letters Patent in France, dated July 6, 1891, No. 214,662,) of which the following is a full, clear, and exact description.

My invention is an improvement in the class of plows whose beams are attached at their front ends to a truck, or wheeled frame.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
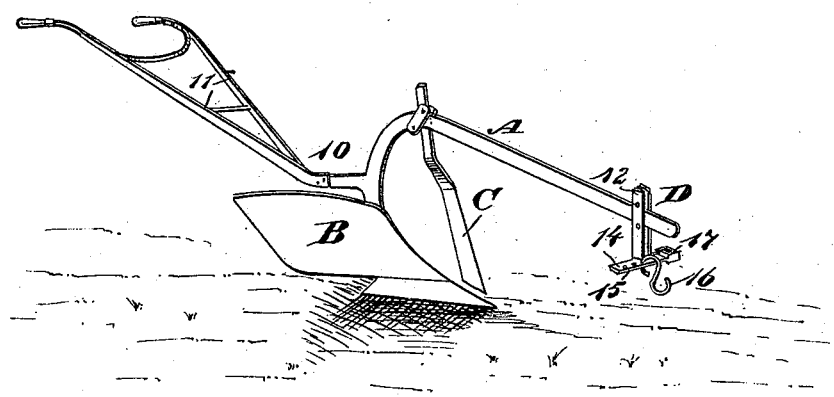
Figure 2:
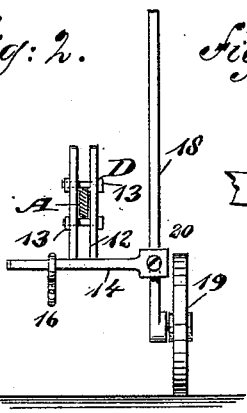
Figure 3:
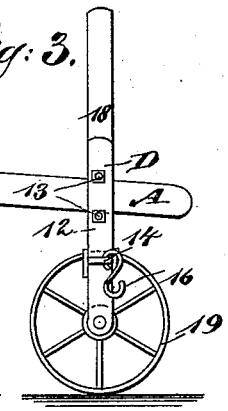
Figure 4:
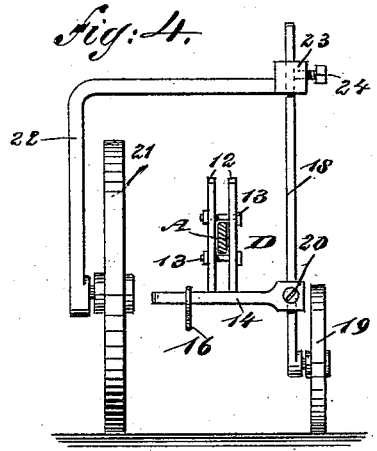
Figure 5:
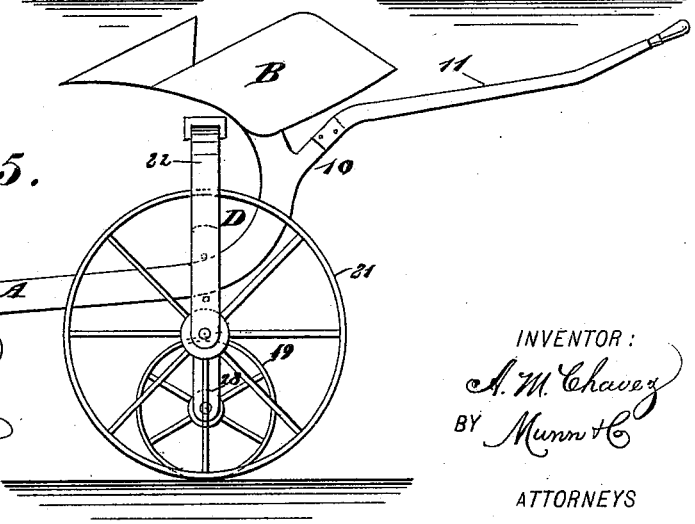

Figure 1 is a perspective view of the plow, illustrating the stirrup attached thereto. Fig. 2 is a transverse section through the plow beam, the stirrup being shown in front elevation and a carriage comprising a single wheel connected with the stirrup. Fig. 3 is a side elevation of the carriage and stirrup as shown in Fig. 2. Fig. 4 is a transverse section through the plow beam, illustrating the application thereto of the stirrup, and the attachment to the beam through the medium of the stirrup, of a two-wheeled carriage; and Fig. 5 is a side elevation of the plow in a reversed position and mounted upon the carriage for transportation to and from a field.

The plow beam A, at its upper portion is straight and horizontally located, and the rear of the beam is curved downwardly and forwardly in the direction of the ground and fitted at its lower end for attachment to a share B, of any approved shape or construction.

From the back of the downwardly-curved portion of the plow beam an arm 10, is rearwardly projected, to which the handles 11 of the plow are secured. A stirrup D, is adapted to be attached to the straight section of the plow beam. This stirrup is preferably made in the shape of an inverted T, comprising a vertical member 12, consisting ordinarily of two parallel and spaced plates between which the beam A, is passed, the plates being connected by bolts 13, passed through them, one above and the other below the beam, as shown in Figs. 2 and 4. The horizontal member 14 of the stirrup usually consists of a single plate or block having formed therein a series of apertures 15 for the reception of a clevis or traction hook 16; and at one end of the horizontal member of the stirrup an opening 17, is made, adapted to receive a vertically disposed rod or bar 18, which rod or bar extends some distance above the stirrup and also below it, and upon the lower end of the rod or bar a small wheel 19 is journaled. The rod or bar is preferably polygonal in cross section, which is likewise the shape of the opening 17 in the stirrup through which the bar passes, and the bar and stirrup are held in engagement one with the other through the medium of a set screw 20, or the equivalent thereof. The stirrup D, however, may be made simply L-shaped, or it may be made straight, in which latter event its construction is identical with that of the vertical member 12 illustrated.

The bar 18 and wheel 19, are adapted to serve as a carriage for the forward end of the plow beam; and instead of by a single carriage the beam may be supported by a double or two-wheeled carriage, in which event the second wheel 21, is much larger than the wheel 19 first described, and is journaled upon the lower end of an angular bar 22, the horizontal member of which bar is provided with a socket 23 at or near its outer end, through which the upper portion of the straight carriage bar 18, carrying the small wheel 19, is passed; and the two bars 18 and 22, are held in engagement by a set screw 24, or the equivalent thereof, as is best shown in Fig. 4.

In sliding the stirrup in direction of the end of the plow beam, or in direction of the rear curved portion thereof, the plow share may be made to enter the ground more or less deeply. The nearer the stirrup is carried to the share the deeper the point of the latter will enter the ground, and consequently the deeper will be the furrow.

When the plow is to be carried to or from the field the stirrup is removed from the plow, the plow is reversed and its beam passed through the vertical member of the stirrup, the stirrup being carried rearward beneath the share, as shown in Fig. 5; and when the plow is so disposed the double carriage is employed as being capable of more convenient use.

Upon arriving at the field the bar 22 and large wheel 21, may be removed and the smaller wheel only be employed to support the beam; or both of the wheels may be disconnected from the stirrup if such arrangement is found desirable.

Preferably in connection with the plow beam a sod cutter C, is employed, which is clipped upon the plow beam in such a manner as to render the turner adjustable upon the beam. This cutter is preferably made to partake of the shape illustrated in Fig. 1, in which it is practically a straight blade, being curved slightly intermediate of its ends so as to bring the lower portion of the blade, which is its widest portion, over the point of the plow share.

Having thus described my invention, I claim as new and desire to secure by Letters Patent—

1. The combination, with a plow beam, of a stirrup comprising a shank adjustably located upon the beam, and a head adapted to receive a traction hook or clevis, of a carriage connected with the plow beam through the medium of the stirrup, as and for the purpose specified.

2. The combination, with a plow beam, of a stirrup essentially T-shaped in general contour, adjustable upon the beam and provided with a series of apertures in its horizontal member and an opening at one end of the same, the apertures being adapted for the reception of a traction hook or clevis, and a carriage consisting of a bar passed through an opening in the horizontal member of the stirrup, a fastening device connecting the bar with the stirrup, and a wheel carried by the lower end of the bar, as and for the purpose specified.

3. The combination, with the plow beam, of a stirrup essentially T-shaped in general contour and adjustably attached to the beam, the said stirrup being provided with an opening near one end in its horizontal member, and a carriage consisting of a bar carried vertically upward through an opening in the horizontal member of the stirrup, a fastening device connecting the stirrup and the bar, a wheel carried by the lower end of the bar, a second angular bar having removable connection with the bar connected with the stirrup, and a larger wheel carrried by the angular bar, the wheels being located one at each side of the beam, as and for the purpose set forth.

AGUSTIN M. CHAVEZ.

Witnesses:
  LUIS G. SECERRIS,
  RÓMULO UGALDE.